JOHN H. McLEOD
OTTO SANDVIK
INVENTORS

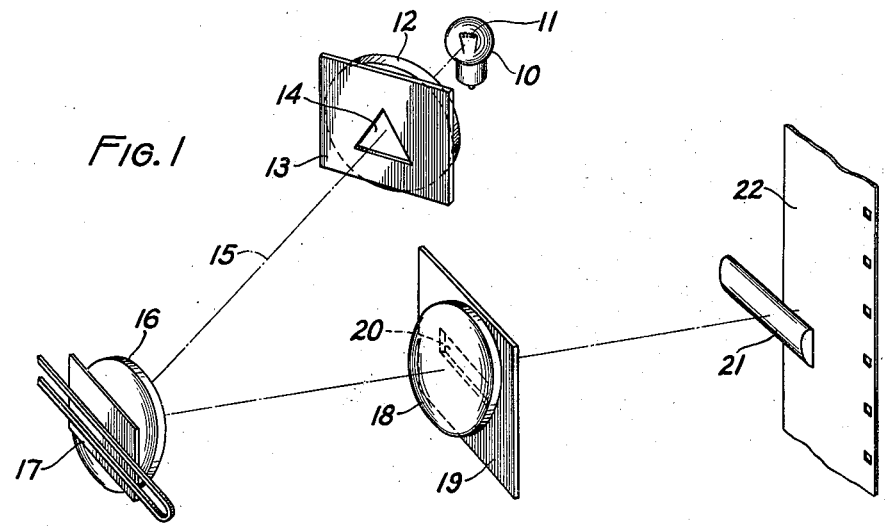
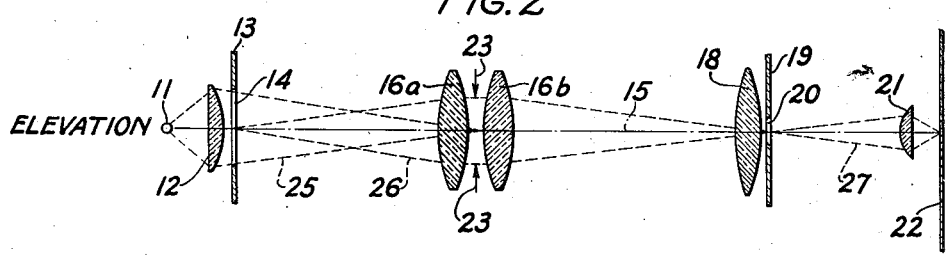
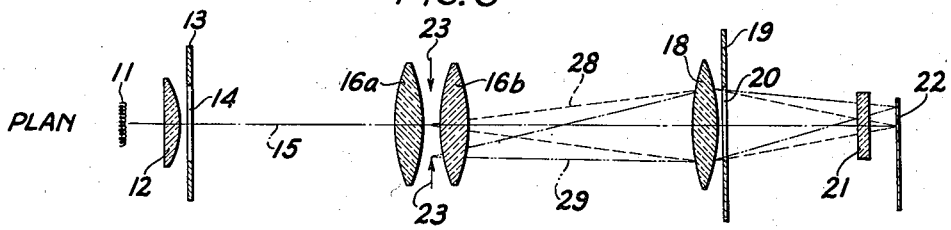

BY

ATTORNEY

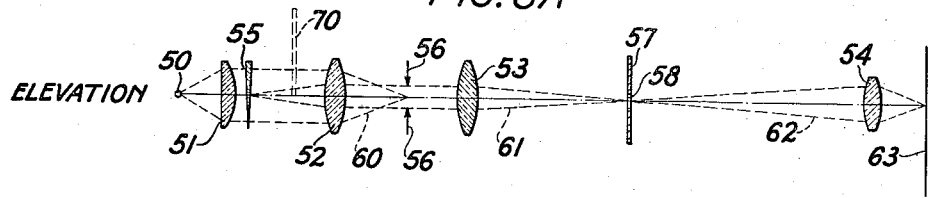
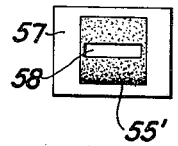
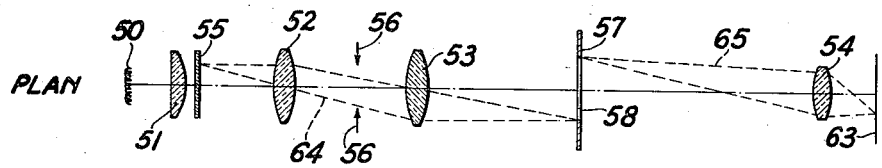
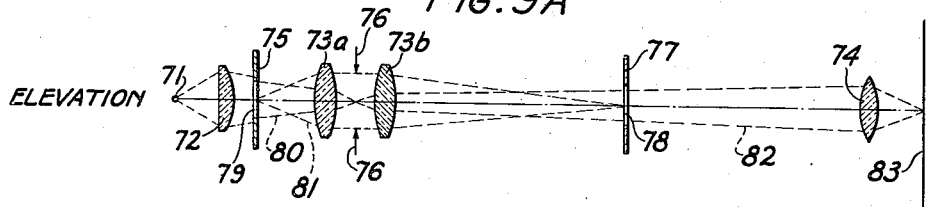
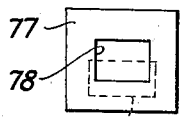
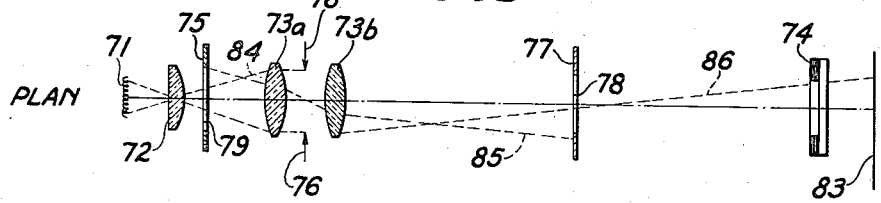
John H. McLeod
Otto Sandvik
INVENTORS Patented Sept. 16, 1941

2,256,402

UNITED STATES PATENT OFFICE 2,256,402

VARIABLE DENSITY SOUND RECORDING

John H. McLeod and Otto Sandvik, Rochester, N. Y., assignors to Eastman Kodak Company, Rochester, N. Y., a corporation of New Jersey Application April 9, 1940, Serial No. 328,714

8 Claims. (Cl. 179—100.3)

This invention relates to optical systems for recording sound-on-film and particularly to those of the type which provide a variable density sound track.

It is an object of the invention to provide means for recording variable density sound tracks using a galvanometer as the light modifying means. It is also an object of the invention to provide variable density recording means using the triangular or saw tooth type apertures which have been so successful in variable area recording systems.

It is a particular object of the invention to provide such a system which is highly efficient with regard to the percentage of the light which is employed usefully.

It is also an object of the invention to provide a sound optical system which permits considerable tolerance in the positioning of the lamp filament and in the type of filament used. The presence of such tolerance reduces and practically eliminates microphonics (i. e. foreign signals) due to vibration of the filament.

It is an object of one particular embodiment of the invention to provide a sound recording system for use with color film, which system provides push-pull recording either of the class A or the class B type.

According to the invention, these objects are obtained by an optical system including the following elements:—A film plane through which the sensitive film to be scanned may be moved, an optical system for forming a short thin line of light on the film plane and a galvanometer mirror arranged to control the intensity of this line of light which mirror is oscillated in accordance with the sound signal to be recorded. The relative orientation of the various elements of this system is best explained by using the terms "horizontal, vertical, height, top, bottom, up, down, etc." and hence these terms are employed throughout this specification and the accompanying claims. However it is to be understood that these terms are merely relative to one another or if a twisted optical system is used are merely relative to the adjacent optic axis and do not necessarily refer to any absolute orientation in space. The film band will be considered as moving vertically and hence the line of light must be horizontal and the galvanometer mirror preferably oscillates about a horizontal axis.

The optical system includes a light source preferably having a horizontal elongated filament which may be of the ribbon type, but which in one embodiment may even be of the coiled type. A positive lens is positioned in front of the source to focus an image of the filament near or on the galvanometer mirror. Since the definition of this image is not critical, the lens is referred to as a condenser lens. Adjacent to the condenser lens (either immediately behind it or between it or between it and the galvanometer but not too far from the lens) is placed a mask with an aperture which for example may be triangular or saw-tooth shape so that the transmission from top to bottom thereof varies continuously. A density wedge may alternatively be used, but one of the advantages of the present invention is that such a wedge is not necessary. One or more lenses are placed between the mask and the mirror and between the mirror and the film plane to form an aerial image of this aperture on a second mask having a horizontal slit therethrough. This image is referred to as an aerial image since the important part thereof is the part passing through the slit. Preferably only a single lens is used to form this aerial image; the light passing through this lens twice, i. e. before and after being reflected by the mirror. As the mirror vibrates, this aerial image moves up and down on the second mask across the slit so that the amount of light passing therethrough varies.

Between this second mask and the film plane, there is placed a small cylindrical lens with its cylindrical axis horizontal to focus an astigmatic image of the slit on the film. A positive lens acting as a field lens is placed adjacent to the second mask and is of such power that it focuses an image of the galvanometer mirror on the film plane (in the absence of the small cylindrical lens). That is, this field lens is of such power that the mirror and the film plane are conjugate relative thereto.

With this optical system, a true variable density recording results since the light is uniformly distributed on the film and a change of effective length of the horizontal slit results only in a change in the intensity of the line of light on the film. If the condenser lens forms an image of the filament exactly on the galvanometer mirror and the field lens near the second mask refocuses this image exactly onto the film, this image would tend, in spite of the cylindrical mirror, to remain in focus in a vertical direction on the film (i. e. to be horizontally punctual) since the cylindrical lens only focuses the light to a horizontal line. If it appears desirable to eliminate at the the film plane all variations in intensity caused by this horizontally punctual image, any one of several modifications may be used. A ribbon filament lamp may be used; an additional weak cylindrical lens can be added to throw this image out of focus, or preferably it may be thrown out of focus either by having the condenser lens throw the image of the filament substantially but not quite on the galvanometer mirror or by having the field lens of such power that the mirror and film plane are not quite conjugate relative thereto.

Obviously the mask near the condenser lens may be arranged with its triangular aperture pointed either up or down, i. e. with its apex up or down. The present invention may be applied to recording of sound on color film and by the following simple modification provides either class A or class B push-pull sound recording. In this embodiment, the aperture is made up of two parts, the upper part consisting of a triangle or triangles (saw tooth) with the points down and the lower part consisting of a triangle or triangles with the points up. The upper part is covered with a color filter for example a blue transmitting filter and the lower part with another color filter for example a red transmitting filter. On the film there will be recorded two superimposed sound tracks, one red and one blue, which are in push-pull relation to one another. If the triangles are arranged so that their apexes are in the same horizontal level, these sound tracks are in class B push-pull relation, which of course provides so-called "noiseless" recordings.

The invention will be more fully understood from the following description when read in connection with the accompanying drawings in which:

Fig. 1 is a perspective view of one embodiment of the invention.

Fig. 2 is a cross section in elevation of the embodiment shown in Fig. 1 with the optic axis drawn as a straight line.

Fig. 3 is a cross section in plan of the embodiment shown in Figs. 1 and 2.

Figure 6A:
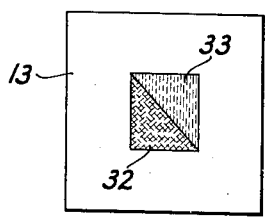
Figure 6B:
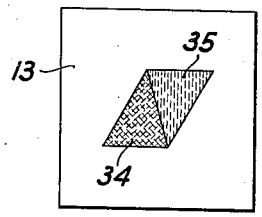
Figure 6C:
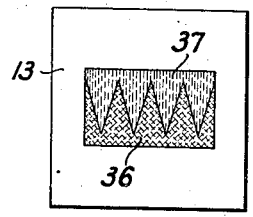

Figs. 6A, 6B, and 6C show various forms of the type of aperture used to provide class A push-pull recording on color film.

Figure 7A:
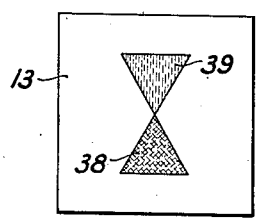
Figure 7B:
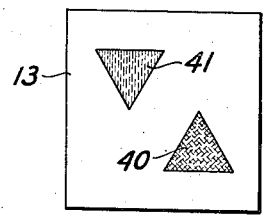
Figure 7C:
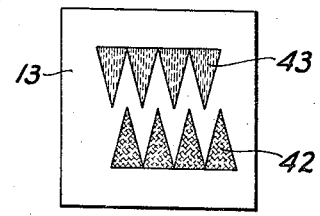

Figs. 7A, 7B, and 7C show similar apertures to give class B push-pull recording.

Figure 7D:
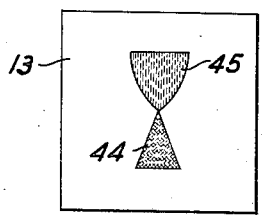

Fig. 7D shows a modification of these apertures to compensate for filter factors.

Figs. 8A, 8B, 8C, and 8D illustrate one form of the prior art.

Figs. 9A, 9B, 9C, and 9D illustrate another form of the prior art.

In Fig. 1 a light source 12 having a coiled horizontally elongated filament 11 sends out a light beam whose optic axis is indicated by the broken line 15. This light beam passes through a series of lenses 12, 16, 18, and 21, and falls on a sensitive film 22. A mask 13 having a triangular aperture 14 is positioned near the lens 12 and a second mask 19 having a horizontal slit 20 is placed near the lens 18. The light from the lamp 10 passes through the lens 16 and is reflected by a mirror 17 of a galvanometer back through the lens 16. This galvanometer mirror 17 is caused to oscillate about a horizontal axis in the well-known manner in accordance with the sound signal to be recorded.

The optics of this system are perhaps better understood from Figs. 2 and 3 in which the galvanometer mirror 17 is represented by arrows 23, and the optic axis 15 is drawn as a straight line. The effect of any oscillations of the mirror 17 (Fig. 1) is to cause the light rays to bend up and down as they pass the region indicated by the arrows 23 in Figs. 2 and 3. Since the light passes twice through the lens 16 in Fig. 1, this lens has to appear twice in each of Figs. 2 and 3 and is designated 16A and 16B.

Thus in Figs. 1, 2 and 3, the condenser lens 12 is of such power and is so positioned that it focuses an image of the filament 11 on or near the galvanometer mirror 17 (plane 23), as indicated by the broken line 25. The lens 16 is of such power that it focuses an image of the aperture 14 on the second mask 19 as indicated by broken line 26. As the galvanometer mirror 17 oscillates this aerial image on the mask 19 moves up and down across the slit 20 so that the effective width of the beam of light passing through the slit 20 changes. The cylindrical lens 21 is in such a position and of such power that it focuses an image of the slit 20 onto the film 22, as indicated by the broken line 27. If the distance from the mask 19 to the lens 21 is for example five times the distance from the lens 21 to the film 20, the width of the slit may be five times that permitted for the line of light which scans the film 22. Since the slit 20 is not very high, the field lens 18 placed near this mask 19 has little if any effect in a vertical plane.

However, as shown in Fig. 3, by the broken lines 28 and 29, this field lens 18 images the galvanometer plane 23 in the film 22. This focusing is in a horizontal direction only since the cylindrical lens 21 causes the image of the plane 23 to be in front of the film 22 in any vertical plane.

Various alternatives are possible without departing from the spirit of the present invention. For example a ribbon filament lamp may be used instead of the coil filament lamp 10. This would be an advantage since in the exact arrangement shown the condenser lens 12 and field lens 18 form a horizontally punctual image of the filament on the film 22. With a ribbon filament lamp, this horizontally punctual image would have uniform intensity throughout its length. On the other hand if it is desirable to use a coil filament lamp, or even when a ribbon filament lamp is used, either or both of the lenses 12 and 18 may be slightly out of focus so that this horizontally punctual image does not fall on the film 22.

Figure 4:
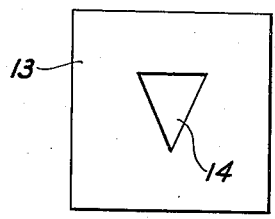
Fig. 4 shows one form of mask which may be used in the embodiment shown in Fig. 1.
Figure 5:
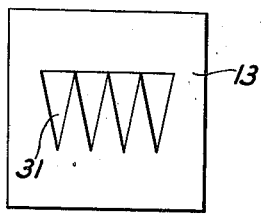
Fig. 5 shows another form of such a mask.

Another but unimportant alternative is to have the aperture 14 in the mask 13 with its apex down as shown in Fig. 4 instead of up as shown in Fig. 1. Or again the aperture may be made up of several parts such as a saw-tooth 31 as shown in Fig. 5. In fact it is quite possible to use a filter wedge of varying density (such as shown in Fig. 8C) at this condenser lens 12 instead of the mask 13 but one of the advantages of the present invention is to eliminate the need for such a wedge. Other possible arrangements of the aperture mask 13 are shown in Figs. 6A to 7B which will be discussed separately in connection with an embodiment of the invention applied to variable density recording on color film.

Another alternative but less preferable arrangement would be to have the galvanometer mirror 17 at an angle say 45 degrees to the optic axis 15 so that the light would pass only once through the lens 16 and then would be reflected up or down through the rest of the optical system. Obviously, additional lenses and/or mirrors may be necessary in this case. Also, it is immaterial whether or not the light from the lens 16 is collimated as it passes to the mirror 17.

Since the present invention is an important advance in a well-worked art, it appears desirable to explain this invention and its advantages in terms of certain prior systems. For the sake of uniformity and to make the description of these prior systems conform to that of the present invention, some of these systems have been illustrated (as Figs. 8A to 9D in the accompanying drawings) in exactly the same way as the present invention is shown in Figs. 2 and 3.

In Figs. 8A to 8D, a light source 50 having a horizontally elongated filament sends light through a condenser lens 51 which directs the light either in a collimated, slightly diverging or slightly converging beam through a variable density wedge 55. As indicated by lines 60, this light is brought to focus by a lens 52 onto a galvanometer mirror whose plane is indicated by arrows 56. An image (55' in Fig. 8D) of the density wedge 55 is projected by the lens 52 and an additional lens 53 onto a second mask 57 having a horizontal slit 58 (as shown by the broken lines 61 and 64). The fact that two lenses 52 and 53 are used instead of applicant's single lens 16 and the fact that the light is brought to focus on the mirror by the lens 52 is not one of the important differences of the present invention. As shown by the broken lines 62 and 65, a complete image of this horizontal slot 58 is formed by a spherical lens 54 on film 63. Applicants use of a cylindrical lens at this point gives a system which is entirely different optically and is a decided advantage as will be pointed out later. The prior art also shows that the wedge 55 may be replaced by an opaque member 70 indicated by the broken line in Fig. 8A. The shadow of this opaque mask 70 includes a penumbra which will have the same appearance as the image 55' when it reaches the mask 57. The width of the sound track on the film 63 is determined by the length of the slot 58 in the mask 57 since an exact image of this slit 58 is formed as shown by the broken line 65 on the film 63.

In the present invention, by employing two lenses namely the spherical lens 18 which acts as a field lens and the small cylindrical lens 21, instead of the single spherical lens 54 a much more efficient system is provided and it is possible to use a simple triangular or saw tooth aperture in mask 13. In fact, the present invention permits a working aperture of better than f/2 in a vertical plane and better than f/4 in a horizontal plane whereas Fig. 8A is at best f/4 in both planes. Furthermore, although the filament 50 is shown as a coiled filament in Fig. 8B, such a filament would not give commercially satisfactory results in such an optical system, but must be replaced by a ribbon filament lamp having a uniform brightness across the width of the filament area. Uniform brightness is not realized in a coiled filament, especially in one of a small size such as used in 16-mm. sound recording.

Another form of the prior art as illustrated in Figs. 9A to 9D includes a filament 71, a condenser 72 which forms (as shown by the broken line 80) an image of the filament on the galvanometer mirror whose plane is indicated by the arrows 76. A mask 75 having a rectangular aperture 79 is positioned immediately in front of the condenser 72. A lens through which the light passes twice as indicated by 73A and 73B brings an image 79' of the aperture 79 to focus on a second mask 77 having a rectangular opening 78 similar to the aperture 79. The formation of this image is shown by the broken lines 81 and 85. A cylindrical lens 74 is positioned to receive light from this opening 78 and to direct it onto a film 83. However, the cylindrical lens is focused on the galvanometer plane 76 as shown by the broken line 82, which results in a system quite different from the present invention.

Such an arrangement provides no focusing horizontally so that the width of the sound track is determined only by a shadow of the lens 74 as shown by the broken line 86 in Fig. 9B. As indicated in this figure, the end of the cylindrical lens 74 may be painted black so as to make this shadow on the film of any desired size.

Since as shown by broken lines 80 and 82, an image of the filament 71 is first focused in the galvanometer mirror plane 76 and then onto the film 83 (at least vertically punctual), it is necessary to use a perfectly uniform ribbon filament or to put the condenser lens 72 slightly out of focus. However such a modification would introduce a considerable loss of light in this system whereas a similar adjustment in the present invention does not have much effect on the efficiency. Since there is no focusing of the light after the lens 73B in Fig. 9A, the light spreads out onto the diaphragm of the lens 74 and is lost. The maximum relative aperture obtainable in the horizontal plane is about f/20 and this maximum occurs when the mask 77 is placed immediately adjacent to the lens 74 which apparently has not been found desirable.

Another advantage of the present invention over that shown in Fig. 9A is that it permits considerably more tolerance in the vertical position of the lamp filament. Referring back to Fig. 2, it is pointed out that the condenser lens 12 may be so arranged that a magnified image of the filament 11 falling on the galvanometer mirror 17 may be such that it only fills one-half of this mirror and thus a tolerance of plus or minus one-half of the filament thickness is permitted in positioning the filament 11. This degree of tolerance is not permitted in the arrangement shown in Fig. 9A since the lens 74 reimages onto the film whatever falls on the mirror 76. Thus an up and down shift on the galvanometer mirror results in a down and up shift of the image on the film 83. Also in Fig. 9A the resolving power, i. e. the smallness of the line falling on the film 83, is best when the rectangular opening 78 is narrow, i. e. does not have a great height. With a narrow slit at 78 the galvanometer mirror would be permitted to vibrate only through a very small angle, otherwise the aperture 78 must be quite high. The reason for this latter limitation on resolving power is that movement of the image 79' causes the lens 74 to be illuminated obliquely rather than paraxially, whereas in the present invention (wherein only a narrow slit 20 is used) even when the minimum of light is reaching the film, this light passes paraxially through the cylindrical lens 21.

Referring again to Fig. 3 illustrating the present invention, attention is called to the fact that the width of the sound track falling on the film 22 is determined by the width of whatever defines the aperture at the lens 16 and galvanometer mirror 17 (plane 23), a horizontally punctual image of this aperture defining means being formed on the film. Also by having the lens 21 higher than the beam striking that lens, no light is lost to the side of this lens.

Of course additional lenses may be included such for example as a weak cylindrical lens to throw the image of the filament slightly out of focus in the horizontal plane instead of having a condenser lens 12 or the field lens 18 slightly out of focus. However, the simple arrangement employing only four lenses is preferable and it will be obvious to anyone skilled in the art that these four lenses are the minimum permissible if one is to realize the advantages of the present invention.

When recording on color film, separate sound tracks may be recorded in two of the primary colors, in push-pull relation to one another. Variable density push-pull recording is obtainable with the present invention by using an aperture made up of a pair of substantially triangular openings in which one of the openings such as 33, 35, or 37 in Figs. 6A, 6B and 6C is colored primary blue (say) or a portion of primary blue and has an apex downward and the other opening such as 32, 34, or 36 transmits only primary red (or primary green) and is arranged with its apex upward. While the terms, primary red, primary blue, and primary green usually specify colors which overlap slightly, obviously it is preferable in the present invention to use only a very narrow spectral region so as to be sure to affect only one of the color sensitive layers or regions of the color film. The arrangement shown in Figs. 6A to 6C result in a sound track in which the two portions are in class A push-pull relation.

If it is desired to have a track in which the two portions are in class B relation so that so-called noiseless recording results, the two openings of the aperture may be arranged so that the apexes of the triangles are in the same horizontal plane as shown in Figs. 7A to 7D. In the examples the blue transmitting opening is shown as 39, 41, 43, or 45 and the red transmitting opening is shown as 38, 40, 42, or 44. In order to adjust the relative amounts of light affecting the two parts of the sound track it is necessary to select filters having the same filter factor with respect to the color film or to arrange the openings to be of different sizes for example as shown in 44 and 45 in Fig. 7D which could be used for example with color film balanced for daylight, but depending on a tungsten source for its sound recording. Since as shown by the opening 45, it is not absolutely necessary and is sometimes not desirable to have the openings exactly triangular in shape, (in fact the apex may not be even an exact point) these openings are referred to as being substantially triangular in shape.

Having thus described one embodiment of our invention, we wish to point out that it is not limited to the specific structure shown, but is of the scope of the appended claims.

What we claim and desire to secure by Letters Patent of the United States is:

1. A variable density sound recording system comprising a film plane through which a sensitive film strip may be moved vertically, a galvanometer mirror adapted to oscillate about a horizontal axis in accordance with the sound frequencies to be recorded, a light source having a filament, a condenser lens positioned between the source and the mirror for focusing an image of the filament substantially on the mirror, an apertured mask near the condenser lens, the aperture varying continuously in transmission from top to bottom thereof, a lens consisting of at least one positive element near the mirror for focusing between the mirror and the film plane an aerial image of said aperture, a second mask substantially at said aerial image having a horizontal slit for transmitting a section of the aerial image, a positive lens adjacent to the second mask of such power that the mirror and the film plane are substantially conjugate relative thereto and a cylindrical lens with its cylindrical axis horizontally positioned near the film plane for focusing therein a horizontal image of said slit.

2. A system according to claim 1 in which the height of the galvanometer mirror is greater than, and less than three times, the height of the image of the filament focused thereon.

3. A system according to claim 1 in which the condenser lens forms the image of the filament substantially but not quite on the mirror.

4. A system according to claim 1 in which the filament is horizontally elongated.

5. A system according to claim 1 in which the aperture is made up of at least one triangle with one side thereof horizontal.

6. A system according to claim 1 in which the aperture consists of at least one pair of substantially triangular shaped color filters transmitting different primary colors, the upper filter of the pair having its apex down and the lower filter having its apex up.

7. A system according to claim 1 in which the aperture consists of at least one pair of substantially triangular shaped color filters transmitting different primary colors, the upper filter of the pair having its apex down and the lower filter having its apex up, the two apexes being at the same horizontal level.

8. A system according to claim 1 in which the height of the cylindrical lens is greater than the height of the light beam striking that lens.

JOHN H. McLEOD.
OTTO SANDVIK.